United States Patent [19]
Gamblin

[11] Patent Number: 4,550,323
[45] Date of Patent: Oct. 29, 1985

[54] ELONGATED FLUID JET PRINTING APPARATUS

[75] Inventor: Rodger L. Gamblin, Dayton, Ohio

[73] Assignee: Burlington Industries, Inc., Greensboro, N.C.

[21] Appl. No.: 501,785

[22] Filed: Jun. 7, 1983

Related U.S. Application Data

[63] Continuation-in-part of Ser. No. 393,698, Jun. 30, 1982, abandoned.

[51] Int. Cl.[4] .............................................. G01D 15/18
[52] U.S. Cl. .................................. 346/75; 346/140 R
[58] Field of Search .............. 346/75, 140 IJ, 140 PD, 346/140 R

[56] References Cited

U.S. PATENT DOCUMENTS

| | | | |
|---|---|---|---|
| 2,298,030 | 1/1967 | Lewis et al. | 346/75 |
| 3,373,437 | 3/1968 | Sweet et al. | 346/75 |
| 3,596,275 | 7/1971 | Sweet | 346/1 |
| 3,604,980 | 9/1971 | Robertson | 346/75 X |
| 3,618,858 | 11/1971 | Culp | 346/75 X |
| 3,656,171 | 3/1972 | Robertson | 346/1 |
| 3,701,998 | 10/1972 | Mathis | 346/75 |
| 3,714,928 | 2/1973 | Taylor | 346/75 |
| 3,787,881 | 1/1974 | Duffield | 346/75 |
| 3,787,883 | 1/1974 | Cassill | 346/75 |
| 4,314,259 | 2/1982 | Cairns et al. | 346/75 |
| 4,357,614 | 11/1982 | Tamai | 346/140 X |

*Primary Examiner*—Harry E. Moose, Jr.
*Assistant Examiner*—Todd E. DeBoer

[57] ABSTRACT

The individual elements of an elongated array of fluid jet orifices are independently positioned with respect to the individual elements of a second elongated array of individual charging electrodes thus relaxing critical mechanical manufacture and assembly tolerances therebetween. The number of fluid jet orifices is substantially greater than the number of independent charging electrodes so as to permit this independent positioning and the enhanced printing resolution of the apparatus is made possible primarily by the lesser density of individual electrodes in the electrode array.

20 Claims, 8 Drawing Figures

130
PATTERN INPUT
100
PRESSURIZED FLUID SOURCE
128
PRINTING PROCESS CONTROL
120
ORIFICE ARRAY
126
108
116
110
112
CHARGING ELECTRODE
114
124
122
DEFLECTION ELECTRODE
+V
CATCHER
104
106
102
106
SUBSTRATE TO BE PRINTED

D
D
CHARGE TUNNELS
TO CHARGING CONTROL CIRCUITS

Fig-3 PRIOR ART
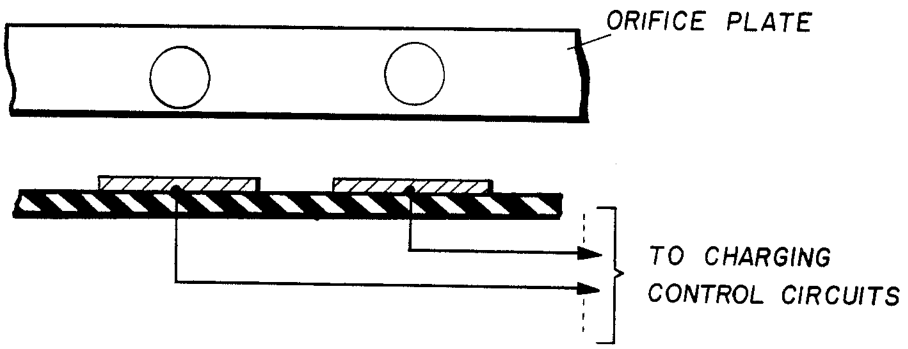
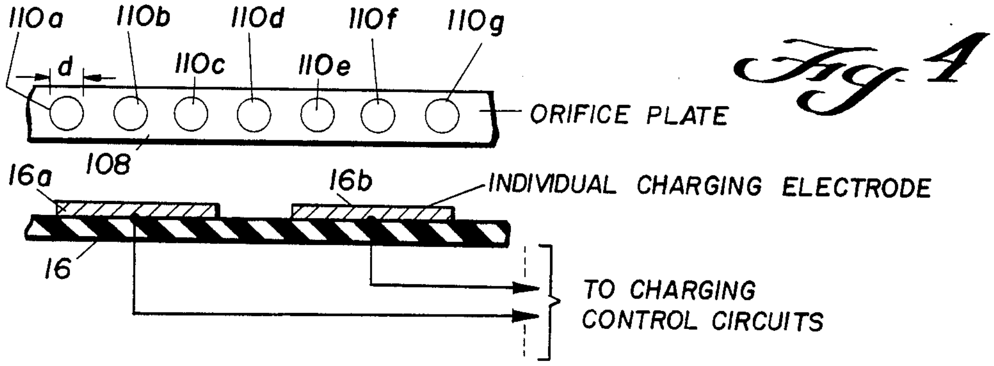
Fig-4
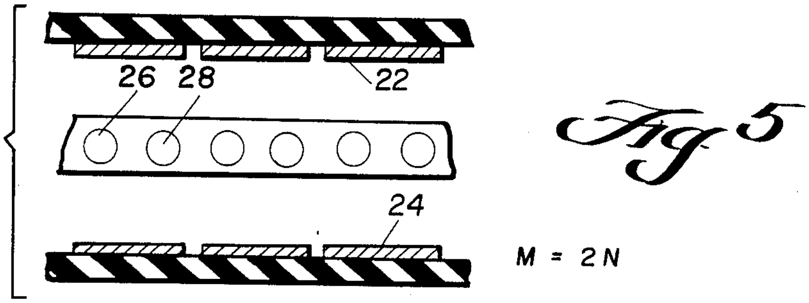
Fig-5

ELONGATED FLUID JET PRINTING APPARATUS

This application is a continuation-in-part of my earlier copending application Ser. No. 393,698 filed June 30, 1982, now abandoned.

This invention is directed generally to fluid jet printing apparatus. In particular, it is directed to an elongated linear fluid jet printing apparatus capable of printing along a virtually unlimited cross-machine width.

Fluid jet printing apparatus of many different types is well known in the prior art. For example, there are a number of present day commercial fluid jet printing apparatuses available.

Typically, such prior art systems provide a linear array of fluid jet orifices from which filaments of pressurized marking fluid (e.g. ink, dye, etc.) are caused to issue. An individually controllable electrostatic charging electrode is disposed downstream in register with each orifice along the so called "drop-formation" zone. In accordance with known principles of electrostatic induction, the fluid filament is caused to assume an electrical potential opposite in polarity and related in magnitude to the electrical potential of its respective charging electrode. When a droplet of fluid is separated from the filament, the induced electrostatic charge is then trapped on and in the droplet.

Typically, only two electrical charging potentials are selectively utilized: either zero or some preset level. Accordingly, by properly selecting the charging potential on each electrode, droplets issuing from each orifice can be selectively charged or left in an uncharged state.

Farther downstream from its respective charging electrode, a droplet typically encounters a relatively strong transversely directed electric field which causes charged droplets to be deflected into a fluid "catcher" for recirculation to the pressurized fluid source feeding the fluid jet orifices. Uncharged droplets typically continue on towards a substrate surface to be marked or otherwise selectively treated (e.g. paper, textiles, etc.). The substrate may be static but is typically moving in a direction transverse to the droplet motion. Known techniques are employed for coordinating the selective charging of individual droplets issuing from selected ones of an array of such fluid jet orifices with substrate motion so as to produce desired patterns on the substrate surface (e.g. geometric patterns, alphabetic characters, etc.).

The following list of prior issued U.S. patents is by no means an exhaustive list of such prior art that is generally relevant to this invention. However, the following list is believed to be generally representative of many prior art fluid jet printing apparatuses:

U.S. Pat. No. 3,373,437—Sweet et al. (1968),
U.S. Pat. No. 3,596,275—Sweet (1971),
U.S. Pat. No. 3,298,030—Lewis et al. (1967),
U.S. Pat. No. 3,604,980—Robertson (1971),
U.S. Pat. No. 3,618,858—Culp (1971),
U.S. Pat. No. 3,656,171—Robertson (1972),
U.S. Pat. No. 3,701,998—Mathis (1972),
U.S. Pat. No. 3,787,883—Cassill (1974).

In general, such prior art utilizes a separate individually controllable charging electrode for each fluid jet orifice. Where arrays of fluid jet orifices are utilized in the cross-machine direction (usually linear arrays), carefully collimated and aligned arrays of equal numbers of fluid jet orifices and charging electrodes are employed.

For example, the only exception to this arrangement in the above listed prior art the FIG. 5 embodiment of Robertson U.S. Pat. No. 3,656,171. Here, a circular array of six small fluid jet orifices is included within a single cylindrical electrode that serves as both a charging and a deflection electrode. However, even here there would obviously be a rather strict requirement for maintaining accurate alignment between the fluid jet orifices and electrodes if such mating structures were to be multiplied into cross-machine arrays.

In general, when prior art fluid jet printing devices are linearly arrayed in a cross-machine direction so as to provide line printing capabilities on a substrate moved in the through-machine direction, a rather severe tolerance requirement results for the manufacture and assembly of the precisely mated fluid jet orifice and individual charging electrode arrays.

For example, in one prior art system depicted at FIG. 2, fluid jet orifices of approximately 0.002 inch diameter spaced at 0.01667 inch center-to-center produce droplets of approximately 0.004 inch diameter. Each such orifice is surrounded by a conductive charge tunnel or electrode having an internal diameter of 0.013 inch. Since the individual charge tunnels must be maintained electrically separate, they cannot be made substantially larger in diameter. If each fluid jet orifice is assumed to be exactly centered within its respective charging electrode, then there is a radial clearance of only 0.0045 inch between droplets and the internal walls of the charge tunnel.

The fluid jet orifice array is typically an array of orifices in a plate which is manufactured separately from the array of charging electrodes (e.g. an array of conductively coated orifices in an insulating substrate). Even assuming that a droplet might be permitted to pass directly adjacent a charging tunnel surface without a problem occurring it will be appreciated that the array of fluid jet orifices and the separately manufactured array of charging electrodes must be manufactured and assembled with respect to one another with no more than an error of 0.0045 inch at any location along the assembled structure. In a typical prior art system having a cross-machine width of about 10 inches, it will be appreciated that the mechanical manufacturing/assembling tolerances must thus often be held to less than about 4.5 parts in 10,000. If the cross-machine direction is multiplied significantly (e.g. as required for typical textile printing applications), the required mechanical tolerances can easily be decreased even further by an order of magnitude or so.

Now, however, it has been discovered that it is possible to totally eliminate this heretofore strict requirement for element-by-element mechanical alignment of the orifice array with the charging electrode array. By effectively "decoupling" these two arrays from any such requirement for element-by-element alignment therealong, the allowable manufacture and/or assembly tolerances are greatly increased. In some circumstances, such an increase in allowable mechanical tolerances is highly desirable if not absolutely necessary for the practical realization of relatively long cross-machine dimensions such as are required, for example, for textile printing and perhaps other applications.

For example, in the case of textile pattern generators, it may be necessary to maintain resolutions on the order of 100 dots per inch over material widths ranging up to two meters or so. For printing onto textile sheeting, relaxed resolutions of perhaps only 70 dots per inch would be required; however, widths in excess of about three meters or so are typically encountered. With respect to high resolution printing of characters or the like onto paper, relatively smaller cross-machine dimensions are usually involved (e.g. 8.5 inches) but resolutions on the order of 300 dots per inch are typically required to meet existing quality standards. In all these applications, the prior art requirement of precise element-by-element alignment between assemblies of separately manufactured orifice arrays and charging electrode arrays presents one of the most difficult and stringent manufacturing requirements.

The present invention is believed to substantially increase the allowable mechanical tolerances in the manufacture and/or assembly of fluid jet printing apparatuses employing separate arrays of fluid jet orifices and individual charging electrodes. In brief summary, the number of fluid jet orifices is substantially increased with respect to the number of individual charging electrodes. In the ultimate limiting (but not practical) form of the invention, an infinite number of fluid orifices would be used to create a virtual fluid sheet. Sections of this virtual sheet would then be selectively charged and deflected to create the desired marking pattern.

The relatively dense linear array of orifices used with this invention is assembled with a relatively less dense array of individual charging electrodes without requiring precise element-by-element alignment along the length of these two assembled arrays. The enhanced printing resolution potential of the resulting system is made possible primarily by the less dense array of individual charging electrodes, while simultaneously freeing the system from the necessity of precise element-by-element alignment. Although some degree of printing error may occur where printing orifices happen to be positioned between individual charging electrodes, these errors can be minimized and are, in any event, inconsequential for many applications. The average printed pixel which can be produced is that laid down simultaneously by the fluid orifices associated with and charged by each electrode. Thus the width of each electrode is approximately equal to the pixel width of the cross-machine dot assemblage and corresponding machine-direction printed line(s) produced by the invention. In the art the individual fluid filament and droplet combination charged by its individually associated electrode is able to print single dots and thus can print machine-direction lines of dots which are only one dot wide.

Stated somewhat differently, this invention provides an elongated fluid jet printing apparatus having an enhanced printing resolution potential and an average pixel width capability of approximately L/N defined as follows: (a) a first elongated array of fluid jet orifices for individually passing fluid jet filaments therethrough has a number M of fluid jets per unit L of length; (b) a second elongated array of individual charging electrodes is positioned downstream of and offset to one side of the first array so as to electrically charge fluid droplets passing thereby as they break away from the fluid filaments; (c) there are a number N of individual charging electrodes per unit L of length; and (d) the number of fluid jet orifices M per unit L of length is substantially greater than the number of individual charging electrodes N per unit L of length.

In the context of the invention a pixel is that unit of print whose laydown is controlled by each charge electrode. The pixel is comprised of one or more dots, depending on how many jets are controlled by each electrode and on how many machine-direction dots are laid down by each jet each time the electrode is without charge. A machine-direction print line is thus the result of the laydown of a series of pixels controlled by the same electrode as the substrate moves past the printing head.

In some of the exemplary embodiments, there are at least twice as many fluid jet orifices as there are individual charging electrodes. Although the array of charging electrodes may be provided on only one side of the fluid droplets in some embodiments, other exemplary embodiments of this invention include a pair of similar arrays of charging electrodes, one positioned on either side of the fluid droplets. Other embodiments are also contemplated where each one of a pair of parallel fluid jet orifice arrays is independently controlled by its respective electrode array, both the orifice and the electrode arrays being offset with respect to one another so as to provide enhanced resolution for the overall printing apparatus.

These as well as other objects and advantages of this invention will be better understood and appreciated by careful study of the following detailed description of the presently preferred exemplary embodiments of this invention taken in conjunction with the accompanying drawings, of which:

FIG. 3 is similar to FIG. 2 in depicting the dimensional features of a prior art fluid jet printing apparatus;

FIG. 4 is a more detailed representation of an exemplary fluid orifice array and charging electrode array utilized in the exemplary embodiment of FIG. 1; and FIGS. 5–8 illustrate alternate exemplary embodiments of fluid orifice arrays and charging electrode arrays that may be employed in the system of FIG. 1.

Figure 1:
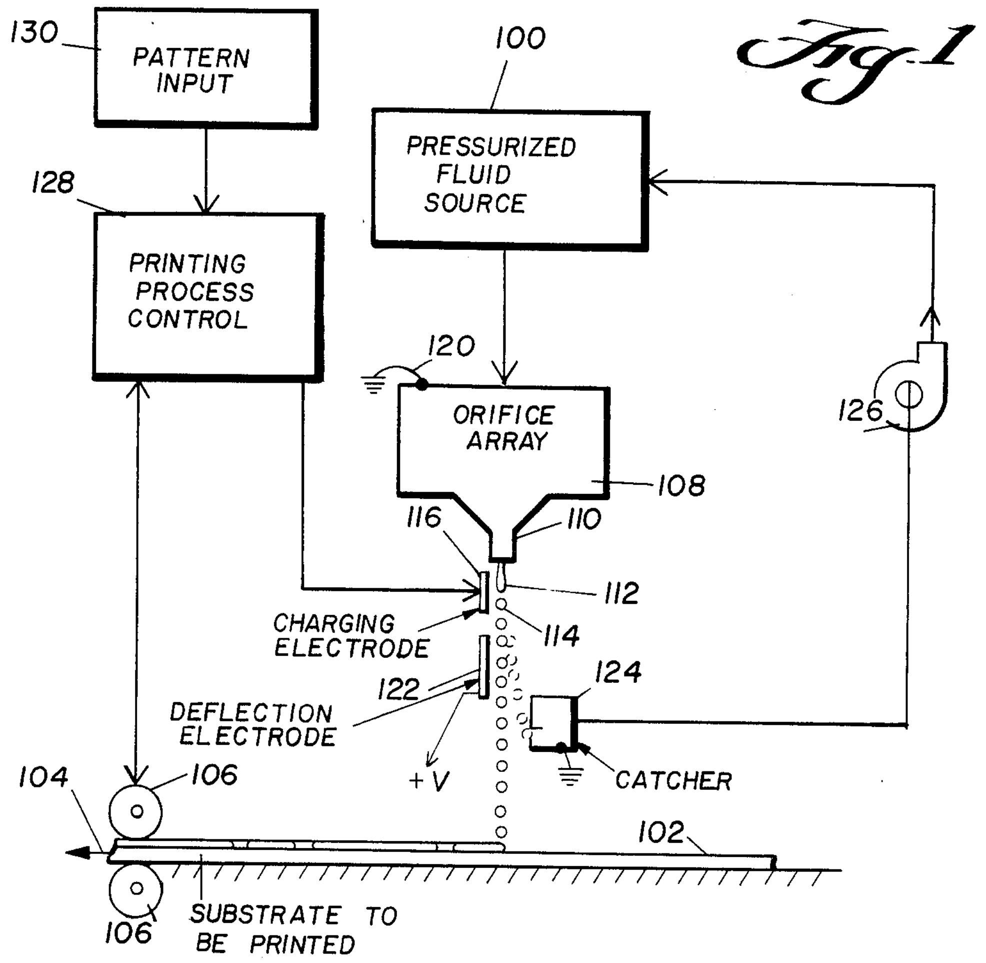
FIG. 1 is a schematic illustration of an overall fluid jet printing system embodying this invention.

The pressurized fluid source 100 in FIG. 1 typically provides ink, dye, or any other fluid which is to be selectively deposited in a desired pattern (e.g. geometrical, character formation, etcetera) onto a moving substrate 102 positioned therebelow. Typically, the substrate 102 is moved in the through-machine direction (as indicated by arrow 104) by conventional transport mechanisms schematically illustrated as driven rollers 106.

The pressurized fluid source 100 typically feeds an orifice array 108 which extends along the entire cross-machine direction (perpendicular to the plane of FIG. 1). Each orifice 110 issues a filament 112 of fluid which breaks into individual droplets 114 in a "drop-formation" zone that can be predicted for any given system in accordance with known physical considerations. A cross-machine array of individual charging electrodes 116 is provided downstream of orifice 110 adjacent the drop-formation zone for selectively applying a charging voltage with respect to the orifice array (which is typically electrically grounded as indicated at 120). Through the electrostatic induction phenomenon, the isolated droplets 114 are selectively charged as they are formed.

As depicted in FIG. 1, the droplets 114 continue downstream to a relatively strong (usually static) electric field directed transversely of the droplet motion from a deflection electrode 122, which causes the charged droplets to be deflected toward a "catcher" or "gutter" apparatus 124. The arrangement is such that any charged droplets 114 are electrostatically deflected into catcher 124 from which the fluid is recirculated to the pressurized fluid source 100 via pump 126. Uncharged droplets 114 are permitted to continue downstream for eventual deposition upon a predetermined location of the moving substrate 102.

Conventional printing process control circuits 128 are employed for coordinating substrate movement (e.g. via transport rollers 106) with selective droplet charging (e.g. via charging electrode 116) in accordance with a conventional pattern input mechanism 130 so as to print the desired pattern onto substrate 102.

Since all of the elements and systems depicted in FIG. 1 are of conventional design except for the orifice array 108 and charging electrode array 116, they need not be described here in further detail. However, those skilled in the art will recognize that there are many possible configurations and variations of an overall fluid jet printing mechanism of the general type depicted in FIG. 1 and that any of them could be employed in the practice of this invention.

Figure 2:
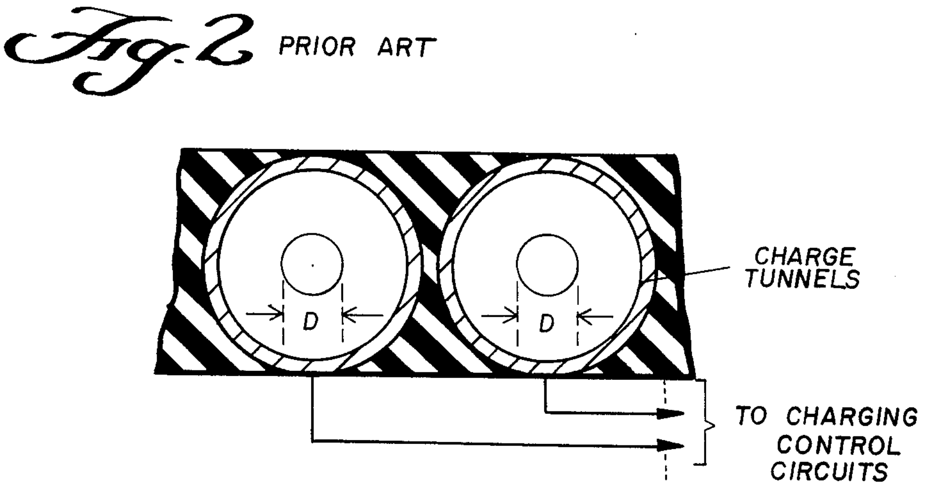
Fig. 2 PRIOR ART
FIG. 2 is an illustration of the relative dimensions and interrelated tolerances in a prior art fluid jet printing apparatus.

Typical prior art structures for the orifice array 108 and the element-by-element precisely aligned electrode array 116 are depicted at FIGS. 2 and 3. As already explained above, the prior art arrangement of FIG. 2 must often be held to overall assembled mechanical tolerances of less than approximately 4.5 parts in 10,000 between the orifice array 108 and the charging electrode array 116 for a cross-machine width of only approximately 10 inches.

Most prior art arrangements provide only a single electrode opposite each fluid orifice as depicted in FIG. 3. However, these prior art systems, particularly if they are built to be capable of high resolutions, still require close mechanical tolerances between the assembled array of fluid orifices and individually mated charging electrodes.

Now, however, with the arrangement of the exemplary embodiment of this invention depicted in FIGS. 1 and 4, it is possible to achieve similar or even higher print resolution without requiring any element-by-element alignment between the individual charging electrodes 16*a*, 16*b* and the fluid jet orifices 110*a*–110*g* in the orifice plate or array 108. The relaxation of allowed mechanical tolerances is achieved by providing a substantially greater number of fluid jet orifices 110 than of individual charging electrodes 16*a*, 16*b*, etc. Thus, even though there is no precise element-by-element alignment between the orifice array and charging electrode array, each individual charging electrode is assured of control over more than one fluid jet orifice.

To maintain the same average fluid flow onto the substrate, relatively smaller diameter orifices 110 should be utilized in this invention as compared to the size of typical prior art orifices. In short, the total integrated orifice area over the array should be maintained at a substantially constant value for most applications. Accordingly, as depicted in FIG. 4, if the same fluid flow is to be maintained as in the FIG. 2 prior art embodiment, then the diameter of each orifice 110 will have to be decreased by a factor based on the square root of the ratio of the orifice densities.

With respect to the embodiments of the present invention set forth in FIGS. 5–8, only a portion of the print head is depicted, it being assumed that the structure would continue outwardly in both directions to the desired cross-machine length. Although these alternative embodiments do assume a predetermined alignment tolerance requirement between two electrode arrays, such requirements are believed less demanding to realize in practice than the prior art alignment requirements between dissimilar structures such as charging arrays and orifice plates. The present invention permits each charging electrode, whether aligned with an opposed electrode as in FIGS. 5, 6 and 7 or offset with respect to the opposing electrodes as in FIG. 8, to address or affect more than one filament and stream of individual droplets coming from the orifice plate.

Figure 6:
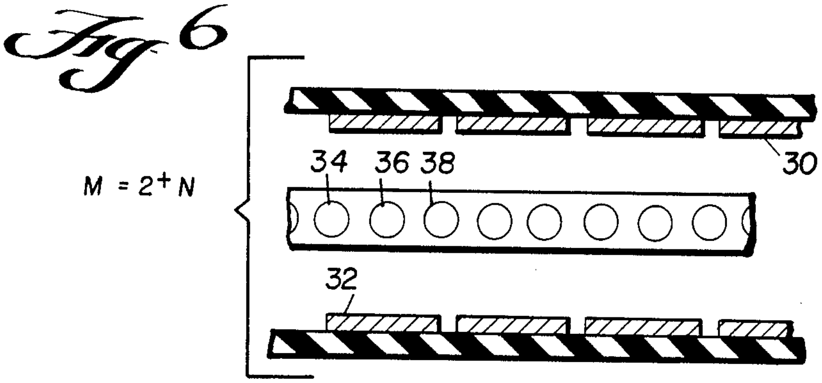

For example, as shown in FIG. 5, each electrode 22 and 24 relates to or addresses at least two filaments 28. In FIG. 6 the electrodes 30 and 32 affect or address as many as three filament streams, such as at 34, 36 and 38, whereas in FIG. 7 each of the electrodes can address perhaps as many as three or four different filaments 44–50. In FIG. 8, each of the electrodes also affects a plurality of jet streams, but with the electrodes in this instance being offset from one another so that none is diametrically paired with another. The two rows of jets are also offset with respect to each other. This latter arrangement provides increased resolution, approximately twice that of a single row of orifices and a single or double electrode array. (Typically a common deflection electrode would be positioned downstream between filament rows 66 and 68.)

Because of these various arrangements, the density of the jet orifices and the filament streams in the present invention will be greater than, say, about 100 per inch, as in a standard ink system, with the comparative density for higher resolution being about 150 to about 400 jets per inch.

To maintain a flow rate consistent with a conventional system, since the holes per inch are increased in number relative to a comparable prior art system, each of the hole diameters of the invention must be decreased according to a formula derived from the numbers and collective areas of the two groups of holes. Assuming round holes, the total area of M holes of the invention of diameter D would be M times $\pi(\frac{1}{2}D)^2$, equal to the total area of M' holes of diameter D' of a conventional system, or M' times $\pi(\frac{1}{2}D')^2$. Solving for diameter D leaves $$D = D' \times \sqrt{\frac{M'}{M}}$$

Thus the size of the holes of the invention is proportional to the square root of the ratio of the two numbers or densities of holes. For example, if in a conventional system the jet density is 100 jets per inch (i.e. a resoltuion of 100 dots per inch) and if a corresponding system is built according to the present invention with 200 jets per inch (with 100 charge elements in both units), the hole size of the conventional system may typically be 0.002 inches whereas the diameter of holes in the present invention could be 0.002 multiplied by the square root of 100/200, or about 0.001414 inches. The flow from each jet orifice in the present invention would be halved, but since there are twice as many holes, the flow per unit length of the orifice plate would be the same in the two systems.

In one presently preferred embodiment of this invention, the individual charge plates are spaced about 0.007 inch center-to-center, or about 143 charge elements per inch. The associated orifices preferably have a center-to-center spacing of about 0.0035 inch or about 283 orifices per inch with the diameter of each orifice being about 0.0013 inch. Droplets will be about twice the diameter of the orifice, i.e., about 0.0026 inch.

The orifice plate and printing head bars in many embodiments of the present invention may be on the order of 1.8 to over 3 meters in length.

In FIG. 5, the electrodes are shown as being positioned in diametrically opposed pairs, such as indicated at 22 and 24, where each pair can address or affect at least two jet streams such as indicated at 26 and 28.

In FIG. 6, the electrode pairs indicated at 30 and 32 are shown as being in position to address up to three steams or filaments of printing material as indicated at 34, 36 and 38.

Figure 7:
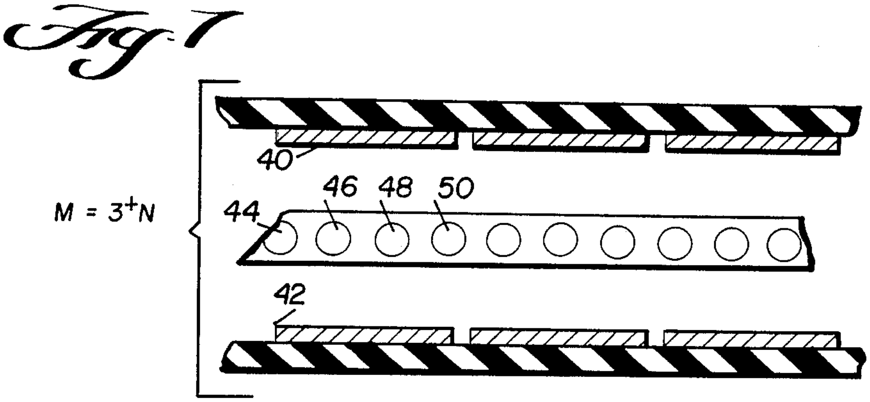
Figure 8:
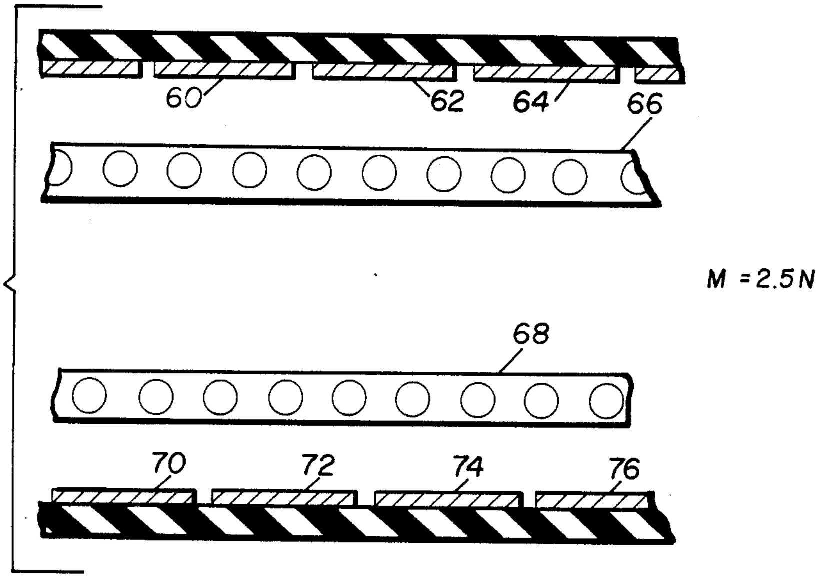

In FIG. 7, the opposed electrode pairs 40 and 42 can address as many as four separate streams of printing material such as are indicated at 44, 46, 48 and 50.

In FIG. 8, electrodes 60, 62 and 64 are positioned on one side of the two staggered rows of jet orifices, respectively, indicated at 66 and 68 while electrodes 70, 72, 74 and 76 are positioned on the opposite side of the two rows. Electrode 60 spans the gap between electrodes 70 and 72 while electrode 72 spans the gap between electrodes 60 and 62. This staggering relationship between the electrodes on opposite sides with the two rows 66 and 68 of orifices continues along the length of the bar so that none of the electrodes is part of a diametrically opposed pair. The accompanying staggering of the jets permits doubling of the printed resolution, compared to a single row of jets.

By coordinately controlling the electrodes in each array it is possible to print or leave gaps along the cross-machine direction at increments essentially equal to the individual electrode width. Wherever printing is effected by both rows of jets the cross-machine resolution is essentially doubled; however the smallest possible increment of print is still a single electrode width.

As indicated above, for most present day applications the charge electrodes of the invention are preferably spaced at about 100 electrodes per inch or more. Each electrode, however, charges between two and three or more of the jets in its vicinity. It is to be noted that since there is no alignment required between the jet orifices and the charge electrodes, a variety of configurations of charge electrodes can be used, of which those shown in FIGS. 4–8 are merely exemplary. Thus, either two or three or more jets would be controlled by the state of only one electrode. As should now be appreciated, the ratio between the number of jets M and the number of individual charging electrodes N per unit of length does not have to be an integer. Indeed, as illustrated in the drawings, there will be varying ratios between each electrode and its adjacent orifices along the length L of the arrays even though there is, of course, always some predetermined average ratio M/N of M orifices to N electrodes. Such varying ratios will result due to the lack of element-by-element alignment and due to variances caused by manufacturing tolerances in the absence of positive alignment as will be appreciated.

With this invention, it is no longer required to maintain close assembled tolerances between the charge plate and orifice plate elements. Thus close tolerances no longer limit the cross-machine width of ink jet systems and their absence further provides for a major reduction in cost even of current apparatus having relatively short cross-machine widths.

There is no basic problem in making orifice plates with suitable hole configurations since conventional fabrications to form fine holes, closely spaced, are available from the semiconductor and/or printed circuit industry. Similarly, charge plates can be constructed to suitable tolerances by conventional techniques (e.g. printed circuit types of photoetching techniques).

If a jet is exactly spaced between charged and uncharged electrodes, it may receive only a fractional charge and thus be deflected only part way toward the catcher or recirculation structure. In such a case, the drop could be slightly displaced on the substrate with respect to where it should be. However, drop catcher structures can be maintained to catch drops at low relative angles and few such errant drops should get to the substrate.

While the present invention has been described in connection with what is presently considered to be the most practical and preferred embodiments, it is to be understood that the invention is not limited to the disclosed embodiments but on the contrary, is intended to cover all modifications and equivalent arrangements thereof which retain any of the novel advantages and features of this invention.

What is claimed is:

1. An elongated fluid jet printing apparatus having an enhanced printing resolution potential and an average pixel width capability of approximately L/N, said apparatus comprising:

a first elongated array of fluid jet orifices for individually passing fluid jet filaments therethrough and having M fluid jets per unit L of length substantially greater than 100 orifices per inch; and a second elongated array of individual charging electrodes positioned downstream and offset to one side of said first array for electrically charging fluid droplets as they break away from said fluid filaments, there being N of said charging electrodes per unit L of length of at least 100 electrodes per inch where the number M is substantially greater than the number N and where there is no element-by-element alignment between said first and second arrays and there are varying ratios between each electrode and its adjacent orifices along the length L.

2. An elongated fluid jet printing apparatus as in claim 1 wherein the number M is at least twice as large as the number N.

3. An elongated fluid jet printing apparatus as in claim 1 or 2 wherein said second array is parallel to said first array.

4. An elongated fluid jet printing apparatus as in claim 3 including a third elongated array of individual charging electrodes positioned downstream and offset to another side of said first array for electrically charging fluid droplets as they break away from said fluid filaments, there being N of said charging electrodes per unit L of length of at least about 100 electrodes per inch where the number M is substantially greater than the number N and where there is no element-by-element alignment between said first and third arrays and wherein said second and third arrays are respectively offset to opposite sides of said first array.

5. An elongated fluid jet printing head comprising:

an elongated orifice plate including means defining at least one elongated row of a plurality of substantially more than 100 per inch of jet orifices, means for supplying printing fluid to said elongated orifice plate and producing a plurality of parallel flows of fluid filaments, at least one extended row of a plurality of on the order of at least 100 individual electrodes per inch disposed on one side of said row of orifices, said plurality of electrodes in each row being spaced from one another along the length of said orifice plate so that there is no element-by-element alignment between said orifices and said electrodes and there are varying ratios between each electrode and its adjacent orifice, but that nevertheless each individual electrode spans across at least two jet filaments emitted from said plurality of jet orifices and the resulting trains of individual droplets formed therefrom, means for applying a predetermined electrical potential to selected ones of said plurality of individual electrodes so as to charge corresponding preselected droplets moving therepast, deflection means for deflecting said preselected charged droplets, and collection means for collecting the deflected droplets.

6. An electrode charging system for charging individual ink droplets emitted from a plurality of fluid jet orifices in a fluid jet printer, said charging system including:

an orifice plate having a plurality of jet orifices arranged in a spaced apart manner along said orifice plate, a pair of horizontally extending rows of a plurality of individual electrodes, said plurality of individual electrodes in each row being spaced from one another along the length of said orifice plate so that there is no element-by-element alignment between said orifices and said electrodes and there are varying ratios between each electrode and its adjacent orifices along the length of the head but that nevertheless such individual electrode spans and electrically accesses at least two jet filaments as they are emitted from said plurality of jet orifices, with each row of individual electrodes being positioned on opposite sides of said plurality of fluid jet orifices, and means for applying a predetermined electrical potential to selected ones of said plurality of electrodes in each row so as to electrically charge preselected droplets moving therepast.

7. An electrode charging system as in claim 6 wherein said orifices are arranged in a single horizontal row and said individual plate electrodes in each row are positioned directly opposite one another.

8. An electrode charging system as in claim 6 wherein said orifices are arranged in a double horizontal row and said individual electrodes in one of said pair of rows are positioned so that they overlap with opposing individual electrodes in the other of said pair of rows.

9. An electrode charging system as in any one of claims 6, 7 or 8 wherein each said individual electrode is a flat plate.

10. An elongated fluid jet printing apparatus comprising:

a linear orifice array of M individual orifices therein disposed along a predetermined cross-machine length; and a linear electrode array of N individual charging electrodes also disposed along said predetermined cross-machine length and parallel to said orifice array but not aligned element-by-element with said orifice array wherein there are varying ratios between each electrode and its adjacent orifices along the length of the arrays, M being substantially greater in number than N, both M and N being at least about 100 per inch along said predetermined cross-machine length.

11. An elongated fluid jet printing apparatus as in claim 10 comprising a plurality of said electrode arrays.

12. An elongated fluid jet printing apparatus as in claim 10 comprising a plurality of said orifice arrays and a plurality of said electrode arrays.

13. An elongated fluid jet printing apparatus comprising:

a linear orifice array of M individual orifices therein and a plurality of linear electrode arrays each having N individual charging electrodes disposed parallel to said orifice array, there being on the order of at least 100 of said individual charging electrodes per inch in each of said electrode arrays, M being substantially greater in number than N;

wherein the individual electrodes in said plural electrode arrays are respectively aligned element-by-element but wherein the orifices are not aligned element-by-element with said electrodes and there are varying ratios between each electrode and its adjacent orifices along the length of the arrays.

14. An elongated fluid jet printing apparatus comprising:

a plurality of parallel linear orifice arrays each having M individual orifices therein; and a plurality of linear electrodes arrays each having N individual charging electrodes disposed parallel to said orifice arrays, there being on the order of at least 100 of said individual charging electrodes per inch in each of said electrode arrays, M being substantially greater in number than N;

wherein the individual electrodes in said plural electrode arrays are respectively in offset alignment with respect to one another and wherein the orifices are not in registered alignment with the individual electrodes and there are varying ratios between each electrode and its adjacent orifices along the length of said arrays.

15. A fluid jet printing apparatus comprising:

a source of pressurized fluid;

a linear array of fluid jet orifices of length L, at least about 1.8 meters, in fluid communication with said source of pressurized fluid for individually passing fluid jet filaments therethrough and having M fluid jets; and at least one linear array of charging electrodes also of length L positioned parallel, downstream and offset to one side of said linear array of orifices for selectively charging fluid droplets as they break away from said fluid filaments, there being N, at least on the order of 100 per inch, of said charging electrodes where the number M is greater than the number N and there are varying ratios between each electrode and its adjacent orifices along the length L.

16. A fluid jet printing apparatus as in claim 15 further comprising a further linear array approximately N charging electrodes offset to the other side of said linear array of orifices.

17. A fluid jet printing apparatus as in claim 15 further comprising a plurality of said orifice arrays disposed parallel to one another and a further electrode array of approximately N charging electrodes offset to the other side of said orifice arrays.

18. A fluid jet printing apparatus comprising:

a first elongated stucture incorporating a linear array of fluid jet orifices having orifices therealong for individually passing fluid jet filaments therethrough; and at least one second elongated structure incorporating a linear array of charging electrodes positioned parallel, downstream and offset to one side of said orifice array for selectively charging fluid droplets as they break away from said fluid filaments, said first and second elongated structures being of substantially equal lengths but having differing respective numbers of orifices and electrodes and being assembled with respect to one another with varying element-by-element orifice/electrode alignments along the length of said linear arrays to provide varying ratios between each electrode and its adjacent orifices along the length of the arrays.

19. A fluid jet printing apparatus as in claim 18 further comprising a further linear array of approximately N charging electrodes offset to the other side of said linear array of orifices.

20. A fluid jet printing apparatus as in claim 18 further comprising a plurality of said orifice arrays disposed parallel to one another and a further electrode array of approximately N charging electrodes offset to the other side of said orifice arrays.

* * * * *